(12) United States Patent
Iwamoto

(10) Patent No.: US 8,176,076 B2
(45) Date of Patent: May 8, 2012

(54) METHOD AND SYSTEM FOR CONTROLLING ACCESSES TO A DATABASE

(75) Inventor: Yuhko Iwamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/316,567

(22) Filed: Dec. 5, 2008

(65) Prior Publication Data

US 2009/0193025 A1    Jul. 30, 2009

(30) Foreign Application Priority Data

Dec. 7, 2007  (JP) ................................ 2007-317138

(51) Int. Cl.
*G06F 7/00* (2006.01)

(52) U.S. Cl. ...................................................... 707/781

(58) Field of Classification Search .................. 707/781
See application file for complete search history.

(56) References Cited

U.S. PATENT DOCUMENTS

| 2002/0073019 | A1* | 6/2002 | Deaton ........................... 705/38 |
| 2007/0245409 | A1* | 10/2007 | Harris et al. ...................... 726/5 |
| 2008/0034231 | A1* | 2/2008 | Ginter et al. ................... 713/194 |

FOREIGN PATENT DOCUMENTS

JP    PUPA2005-71171 A2    3/2005

* cited by examiner

*Primary Examiner* — Fazlul Quader
(74) *Attorney, Agent, or Firm* — Schmeiser, Olsen & Watts; William Schiesser

(57) ABSTRACT

The frequency of occurrences of an exclusion process is reduced so as to enhance the efficiency of handling accesses to a database. A system is provided for controlling accesses to a database. The system includes a database identifying section that identifies a database corresponding to an input of a first access command, an access judging section that judges whether a series of accesses to the identified database initiated by a second access command still continue, a frequency determining section that determines how often accesses to the identified database occur with reference to a history of accesses. The system further comprises an access control section that checks the accesses made by the first access command to the identified database when the series of accesses to the identified database initiated by the second access command still continue and the frequency of accesses to the identified database determined by the frequency determining section is higher than or equal to a predetermined value.

19 Claims, 7 Drawing Sheets

FIG. 4

| OPERATION | COMPUTER | TABLE | ACCESS TYPE | TABLE CHECKING TIME | ACCESS START TIME | COMMIT TIME | NUMBER OF ACCESSES | FREQUENCY OF ACCESSES (EVERY 1 MINUTE) |
|---|---|---|---|---|---|---|---|---|
| ⟨1⟩ | ① | T1 | U | 01:23:45 | 12:34:56 | 23:45:59 | 180 | 335 |
| ⟨1⟩ | ① | T2 | I | 15:43:21 | 16:23:45 | 05:11:23 | 250 | 300 |
| ⟨2⟩ | ② | T3 | I | 03:12:34 | 04:10:12 | | | |
| ⟨3⟩ | ③ | T2 | I | 11:15:59 | | | | |
| ⟨4⟩ | ② | T3 | I | 12:33:21 | 14:11:51 | 18:09:20 | 125 | 100 |
| ...... | ...... | ...... | ...... | ...... | ...... | ...... | ...... | ...... |

25

METHOD AND SYSTEM FOR CONTROLLING ACCESSES TO A DATABASE

FIELD OF THE INVENTION

The present invention relates to a system for controlling accesses to a database. More particularly, the present invention relates to a system for controlling competing accesses made by a plurality of computers to the same database.

BACKGROUND OF THE INVENTION

Clustering systems utilize a plurality of computers to efficiently handle access to databases and data streams going to databases. A clustering system spreads processing load among computers, in a cluster, enabling the computers to process requests successively, as received by the clustering system. For example, when requested to perform a given transaction, the clustering system causes a computer that is currently under the lightest load to process the given transaction. In this manner, the clustering system controls each of the computers to be under substantially the same load, thereby improving the overall processing efficiency. To perform load balancing in a computer cluster, one or more computers must be excluded from a data stream to prevent these computers from receiving additional data to be processed. This exclusion of the one or more computers from the data stream continues until workloads are balanced. Once the balance has been achieved, the excluded computer or computers are included in the data stream again. Exclusion is used to maintain the consistency of the database.

To realize the exclusion process between accesses, the clustering system is required to perform additional operations such as communication between the computers. Therefore, if the clustering system frequently performs the exclusion process, the processing efficiency of the clustered systems may degrade. One example of frequent use of the exclusion process occurs under the condition where the clustering system executes batch processes in parallel. The batch process includes, for example, updating a large number of records successively.

For information about a technique to increase the efficiency of batch processes, please refer to the following Patent Document. Japanese Patent Application Publication No. 2005-071171 titled "Method For Controlling Batch Job Execution".

In order that a clustering system achieves high efficiency even while performing batch processes, it maybe preferable to enable a user to designate a computer that is to perform each batch process, rather than automatically spreading the processing load across the computers. For example, in the case of first and second batch processes which access totally different data sets, the clustering system may cause different computers to perform the first and second batch processes.

In the case of third and fourth batch processes, which access data sets that are largely the same, if the clustering system causes different computers to perform the third and fourth batch processes, the exclusion process happens frequently. Alternatively, if the user designates the same computer for the third and fourth batch processes, the clustering system can be prevented from performing the exclusion process excessively.

However, the data to be accessed by each batch process may not be known in advance. This is the case, for example, for the use of an Enterprise Resource Planning (ERP) package. In ERP, the user often does not know what function a certain table in the database has in application programs. In fact, since the user does not know such a function, the user can use the application programs without regard to the database structure. An ERP package generally refers to a software package to integrate management of the core corporate functions, instead of department-to-department management, in order to make an effective use of the corporate management resources and thus increase management efficiency.

In another example, dynamic Structured Query Language (SQL) may be employed to improve programming efficiency. To be executed, a program written in dynamic SQL is first converted into a program written in conventional SQL. Accordingly, the program cannot be simply referenced in order to find out which table is to be accessed, since the table to be accessed is not known before the program is actually executed.

As discussed above, there are cases where data to be accessed by each batch process is not known in advance. In these cases, it is not known which computer is to be used to execute each batch process to provide efficiency. For this reason, the exclusion process may occur frequently especially when the clustering system performs batch processes. The frequent occurrence of the exclusion process may degrade the overall efficiency of the clustering system.

SUMMARY OF THE INVENTION

A first aspect of the present invention provides a system for controlling accesses to a database. The system includes a database identifying section that identifies a database corresponding to an input of a first access command, an access judging section that determines whether a series of accesses to the identified database initiated by a second access command still continue, a frequency determining section that determines how often accesses to the identified database occur with reference to a history of accesses, and an access control section that checks the access made by the first access command to the identified database, under the condition that the series of accesses to the identified database initiated by the second access command still continue and the frequency of accesses to the identified database determined by the frequency determining section is higher than or equal to a predetermined value.

A second aspect of the present invention provides a computer program product having computer instructions recorded on a computer readable medium, for enabling a computer executing the computer instructions to perform operations comprising: identifying a database corresponding to an input of a first access command, determining whether a series of accesses to the identified database, initiated by a second access command still continue, determining how often accesses to the identified database occur with reference to a history of accesses, and checking the access made by the first access command to the identified database under the condition that the series of accesses to the identified database initiated by the second access command still continue and the frequency of accesses to the identified database determined by the frequency determining section is higher or equal to a predetermined value.

A third aspect of the invention provides, a computing system comprising a processor coupled to a computer-readable memory unit. The memory unit comprises a software application, the software application comprising instructions that when executed by the processor implement the system comprising: a database identifying section that identifies a database corresponding to an input of a first access command, an access judging section that determines whether a series of accesses to the identified database initiated by a second access command still continue, a frequency determining section that determines how often accesses to the identified database occurs with reference to a history of accesses, and an access control section that checks the access made by the first access command to the identified database, under the condition that the series of accesses to the identified database initiated by the second access command still continue and the frequency of accesses to the identified database determined by the frequency determining section is higher than or equal to a predetermined value.

A fourth aspect of the invention provides a method for controlling accesses to a database, comprising: identifying a database by an input of a first access command, determining whether a series of accesses to the identified database initiated by a second access command still continue, determining how often accesses to the identified database occurs with reference to a history of accesses, checking the access made by the first access command to the identified database under the condition that the series of accesses to the identified database initiated by the second access command still continue and the frequency of accesses to the identified database determined by the frequency determining section is higher than or equal to a predetermined value.

A fifth aspect of the present invention provides a system for controlling accesses to a database, comprising, an arbitrating section that excludes one or more competing accesses made by a plurality of access commands to a same database, a database identifying section that identifies a database corresponding to an input of a first access command, an access judging section that determines whether a series of accesses to the identified database initiated by a second access command still continue, and an access control section that checks the access made by the first access command to the identified database under the condition that the series of accesses to the identified database initiated by the second access command still continue.

Other aspects and features of the present invention, will become apparent to those ordinarily skilled in the art upon review of the following non-limiting detailed description of the invention in conjunction with the accompanying figures.

BRIEF DESCRIPTION OF THE DRAWINGS

FIG. 4 illustrates an exemplary data structure of control information stored in a database according to an embodiment of the present invention.

DETAILED DESCRIPTION OF THE INVENTION

Some aspects of the invention will now be described based on an embodiment, which does not intend to limit the scope of the present invention, but exemplifies the invention. All of the features and the combinations thereof described in the embodiment are not necessarily essential to the invention.

Figure 1:
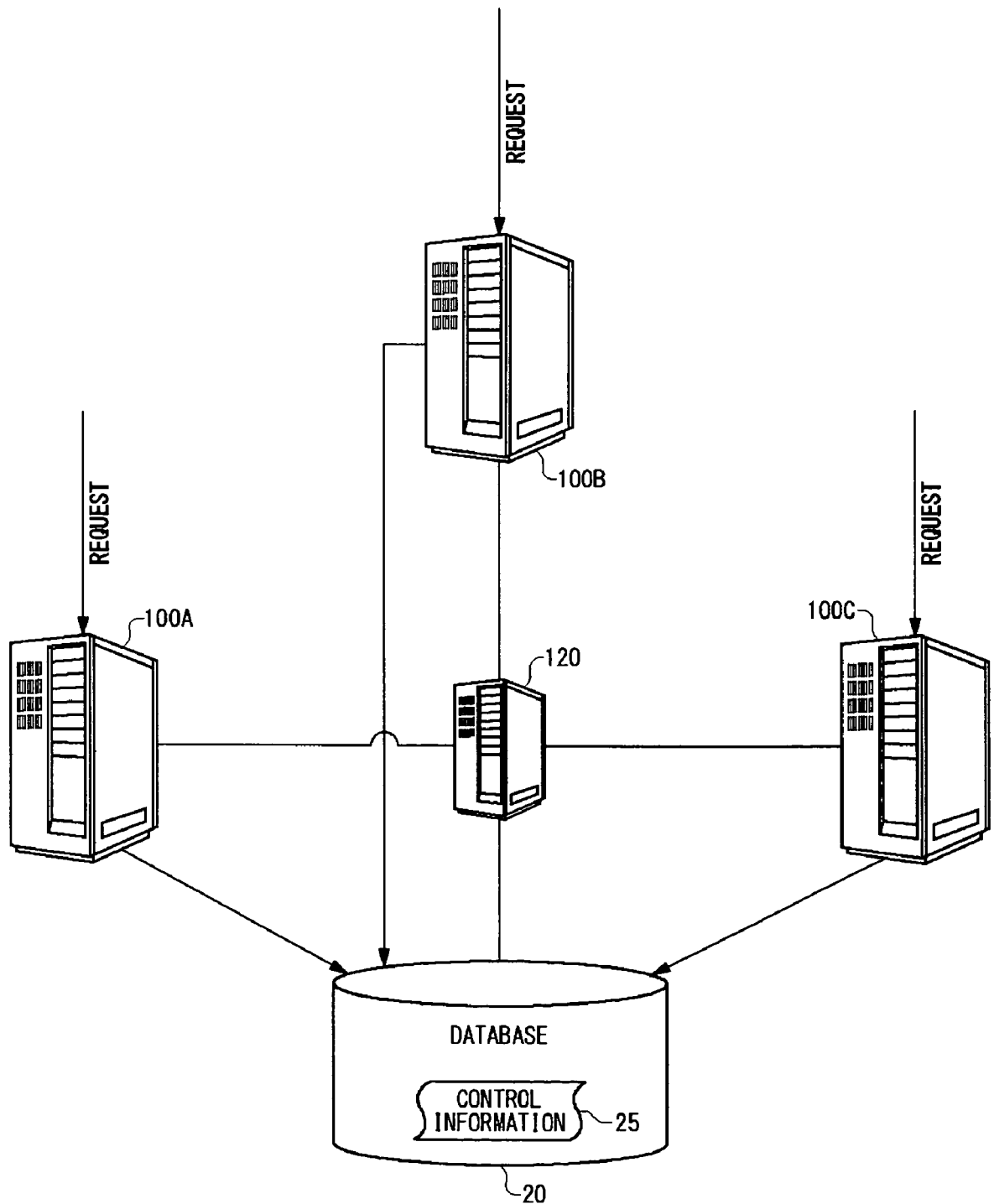
FIG. 1 illustrates an overall configuration of an information system according to an embodiment of the present invention.

FIG. 1 illustrates the overall configuration of an information system 10 relating to an embodiment of the present invention. The information system 10 is a clustering computer system for providing accesses to a database. Specifically, the information system 10 includes therein a database 20, a plurality of computers for accessing the database 20 (for example, processor computers 100A to 100C), and a controller computer 120 for adjusting the accesses made by the processor computers 100A to 100C. While three processor computers are described in this embodiment, it will be recognized by one skilled in the art that the present invention is not limited to three processor computers.

Figure 7:
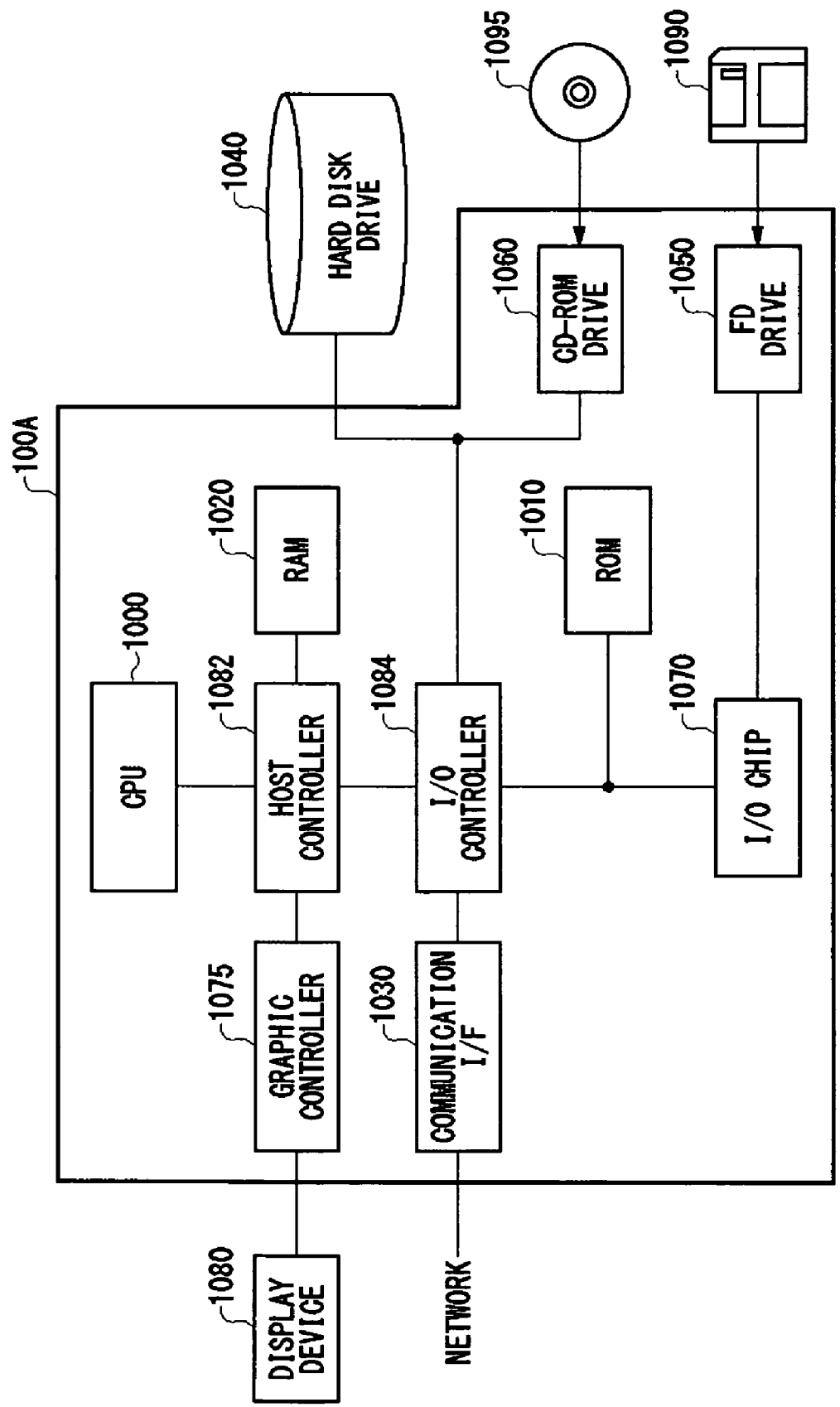
FIG. 7 illustrates an exemplary hardware configuration according to an embodiment of the present invention.

Database 20 is realized, for example, by a storage device such as a hard disk drive 1040 (FIG. 7). The processor computers 100A to 10C access the database 20 independently from each other in response to external requests. The controller computer 120 performs the exclusion process between the competing accesses made by the processor computers 100A to 100C, in order to maintain the consistency of the data stored on the database 20. Under the condition that each of the processor computers 100A to 100C performs a batch process, for example, the accesses may compete against each other frequently, and the controller computer 120 may accordingly need to perform the exclusion process frequently. If such is the case, the processing efficiency of the information system 10 may degrade.

To overcome this, the information system 10 in the present embodiment manages control information 25 in the database 20 which indicates the status of the batch processes. In addition, the information system 10 is configured in such a manner that a new batch process is not started while a competing batch process is being executed. With these configurations, the information system 10 can achieve enhanced efficiency as a whole. The following describes in detail the information system 10 relating to the present embodiment.

Figure 2:
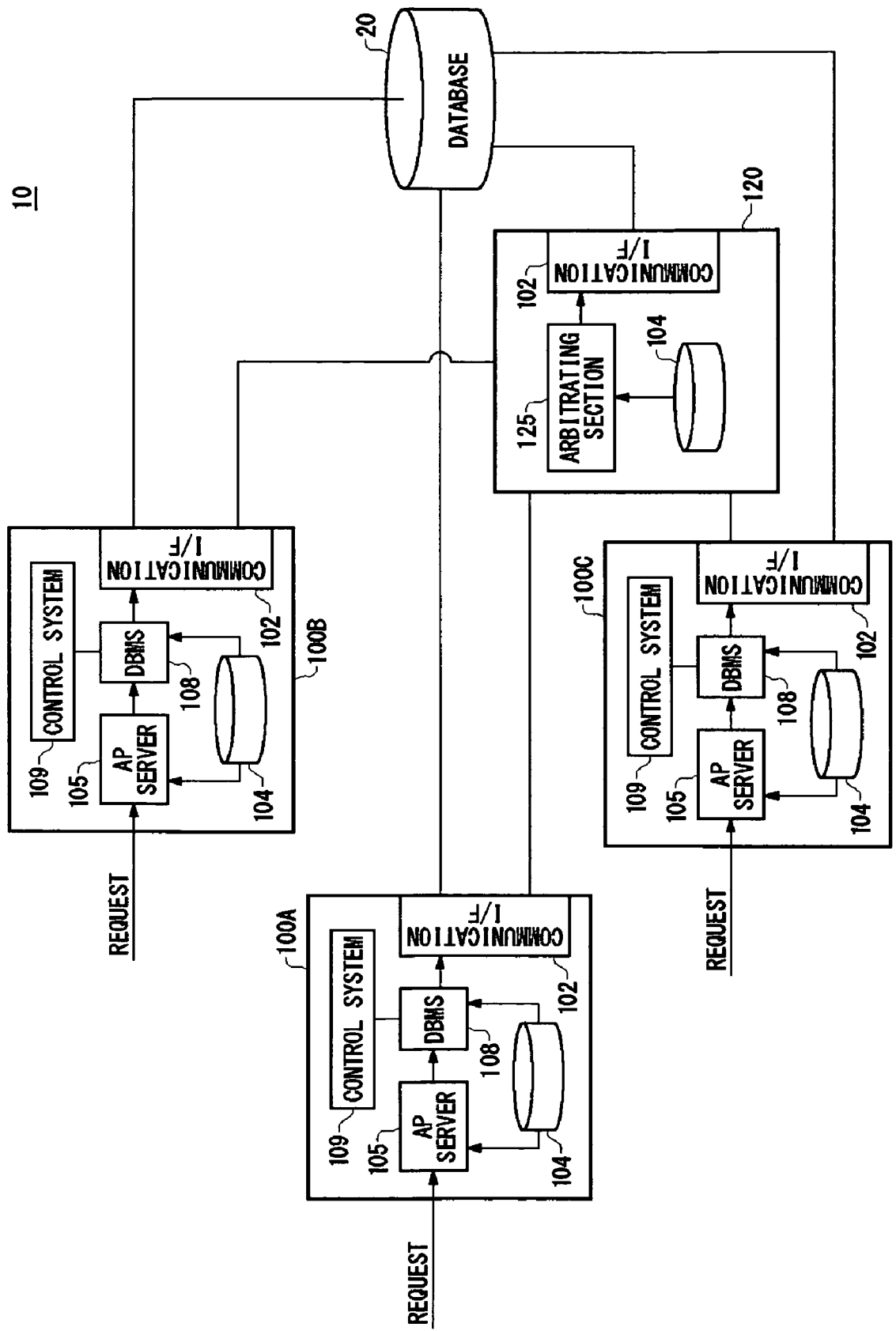
FIG. 2 illustrates a configuration of an information system according to an embodiment of the present invention.

FIG. 2 illustrates a functional configuration of the information system 10 in the present embodiment. As illustrated in FIG. 1, the information system 10 includes database 20, processor computers 100A to 100C, and the controller computer 120. The processor computer 100A includes hardware components, e.g. a communication interface 102 such as a network interface card and a storage device 104 such as a hard disk drive and a memory chip.

The processor computer 100A functions as an AP server 105 and a DBMS 108 by reading the programs stored on the storage section 104 and executing the programs. The AP server 105 executes a pre-installed program (for example, a server program), and performs processes in response to an external request, for example, from a client apparatus.

While performing the processes, the AP server 105 may need to access the database 20. In this case, the AP server 105 issues to the DBMS 108 a command dedicated for a database access, for example, a SQL command. In the following description, such a command dedicated for an access is referred to as one of an access command, a SQL command, and a SQL statement, which all refer to substantially the same type of command.

DBMS 108 interprets the received SQL command and accesses the database 20 in accordance with the contents of the received SQL command. Here, the access may be an update access, for example, a record updating or creating access, or a referencing access such as a record reading access. From the perspective of the hardware, the access is realized in such a manner that DBMS 108 instructs the operating system or device driver to operate the communication interface 102 and thus communicates with a device controlling the database 20 via the function of the communication interface 102.

The processor computers 100B and 100C are substantially the same as the processor computer 100A. Therefore, the processor computers 100B and 100C are not explained herein. The controller computer 120 includes therein a communication interface 102 such as a network interface card and a storage device 104 such as a hard disk drive, as hardware components. The controller computer 120 functions as an arbitrating section 125 by reading programs from the storage section 104 and executing the programs.

The arbitrating section 125 excludes two or more competing accesses made by the processor computers 100A to 100C to the database 20. For example, while the processor computer 100A is updating a certain record, the arbitrating section 125 blocks the processor computer 100B from accessing the same record. In this manner, the arbitrating section 125 can maintain the consistency of the data on the database 20.

Here, if the arbitrating section 125 frequently performs the exclusion process, the overall efficiency of the information system 10 may degrade. Therefore, each of the processor computers 100A to 100C performs a special control when performing a batch process which frequently generates a series of accesses. Specifically, each of the processor computers 100A to 100C further functions as a control system 109 by executing programs stored on the storage device 104. The control system 109 does not cause a corresponding one of the processor computers 100A to 100C to start a new batch process while a competing batch process still continues. In this way, the present embodiment can prevent the degradation in efficiency which is attributed to frequent occurrence of the exclusion process.

Figure 3:
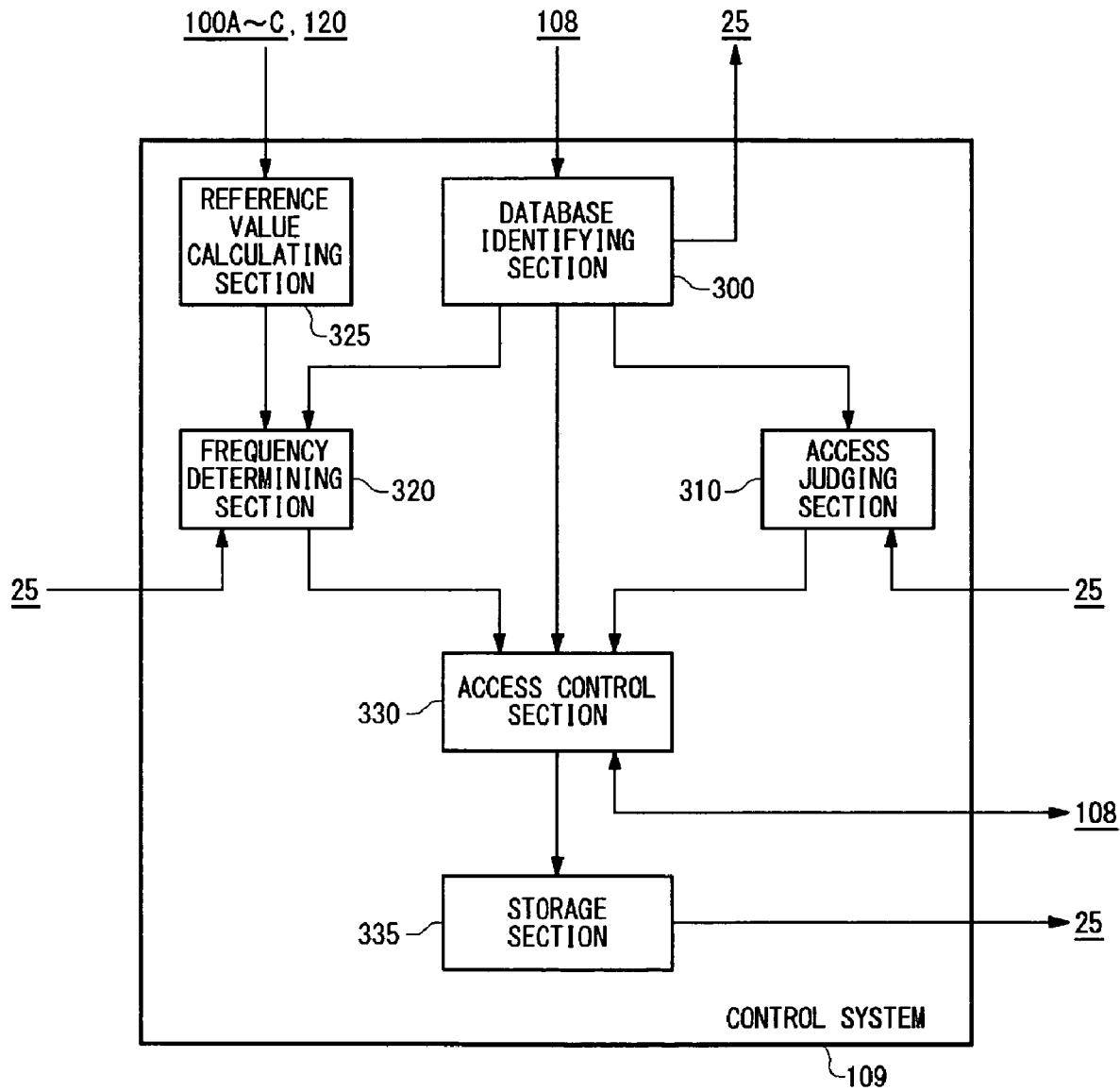
FIG. 3 illustrates a configuration of a control system according to an embodiment of the present invention.

FIG. 3 illustrates the functional configuration of the control system 109 relating to the present embodiment. The control system 109 includes a database identifying section 300, an access judging section 310, a frequency section 320, a reference value calculating section 325, an access control section 330, and a storage section 335. The following describes the control system 109 of the processor computer 100A with reference to FIG. 3. The database identifying section 300 starts operating in response to the input of a new access command into the processor computer 100A. The access command, for example, is a command for a first batch process.

With reference to the input access command, the database identifying section 300 identifies the database to be accessed by the input access command. Here, the database represents unit data defined in terms of storage or management, and is preferably larger than the unit data defined for the exclusion process performed by the arbitrating section 125. Specifically, the database may represent a single table on a relational database, or a table group formed by a predetermined number of tables. For example, under the condition that the database indicates a single table, the database identifying section 300 identifies a table to be accessed by the input access command.

The access judging section 310 judges whether a series of accesses to the identified database initiated by a different access command still continue. For example, the series of accesses indicates a batch process. In the present embodiment, the series of accesses indicates a second batch process different from the above-mentioned first batch process. Alternatively, the series of accesses may indicate a transaction processing operation. To make the judgment as to whether the series of accesses still continue, the access judging section 310 may use the control information 25 which is provided to manage the execution status of batch processes.

The frequency determining section 320 determines the frequency of the accesses to the identified database with reference to the history of accesses to the identified database. The access history may be stored in the control information 25 in association with the identified database. Based on the determined access frequency and the judgment as to whether the second batch process still continues, the access control section 330 controls the accesses to the identified database to perform the first batch process in such a manner as to lower the frequency of occurrence of the exclusion process by the arbitrating section 125.

Specifically, the access control section 330 determines whether the series of accesses to the identified database initiated by the different access commands still continue and whether the frequency of the accesses to the identified database is higher than or equal to a predetermined reference value. Note that the reference value may be calculated by the reference value calculating section 325, for example.

Under the condition that the series of accesses initiated by the different access command still continue and the frequency of the accesses to the identified database is higher than or equal to the reference value, the access control section 330 blocks the accesses initiated by the input access command to the identified database. Following the blocking of the accesses, the access control section 330 notifies DBMS 108 of the blocking, to cause DBMS 108 to suspend the batch process.

When causing DBMS 108 to suspend the batch process, the access control section 330 may cause DBMS 108 to commit the processes that have already been executed before the suspension. In the case where the judgments made are different from the above, the access control section 330 gives permission for the accesses initiated by the input access command. Under the condition that the access control section 330 causes DBMS 108 to commit the processes or permits DBMS 108 to perform the batch process, the storage section 335 records, in the control information 25, the time at which the processes are committed, the time at which the batch process is permitted, or other information.

In the above description, the control system 109 of the processor computer 100A is explained. Note that the control system 109 of the processor computer 100B starts operating in response to an access command input into DBMS 108 of the processor computer 100B and controls the operation of DBMS 108 of the processor computer 100B. Similarly, the control system 109 of the processor computer 100C starts operating in response to an access command input into the DBMS 108 of the processor computer 100C and controls the operation of the DBMS 108 of the processor computer 100C. The control systems 109 of the processor computers 100B and 100C have substantially the same functional configuration as the control system 109 of the processor computer 100A, therefore further description of the control systems 109 of the processor computers 100B and 100C is not believed necessary.

FIG. 4 illustrates an exemplary data structure of the control information 25 stored on the database 20 in the present embodiment. The control information 25 records therein operation identification information identifying a batch process (in FIG. 4, referred to as OPERATION), identification information identifying a computer which issues an access command to perform the batch process (in FIG. 4, referred to as COMPUTER), identification information identifying a table to be accessed by the batch process (in FIG. 4, referred to as TABLE), and the type of the accesses initiated by the batch process (in FIG. 4, referred to as ACCESS TYPE), in association with each other. The type of the accesses includes, for example, creating, updating, and deleting. The above-mentioned pieces of information are recorded in the control information 25 at the start of the batch process. Specifically the database identifying section 300 may obtain the above-mentioned pieces of information with reference to the access command and record the obtained pieces of information in the control information 25, at the time of identifying the database to be accessed.

The control information 25 further records therein the most recent time at which the access determining section 310 determines whether the batch process still continues. Furthermore, the control information 25 records therein the time at which a series of accesses corresponding to the batch process start, and the time at which the batch process is committed. The above-mentioned pieces of information are recorded into the control information 25 by the storage section 335 under the condition that the corresponding determining, access starting, and committing operations are performed.

The control information 25 additionally records therein information indicating the number of accesses. The number of accesses represents the number of accesses made by the corresponding batch process to a target table. The number of accesses is sequentially updated by the storage section 335. Specifically, each time a process in accordance with an access command is committed, the storage section 335 updates the number of accesses in a corresponding record. Furthermore, the control information 25 may record therein the frequency of accesses which is calculated based on the above-mentioned pieces of information.

Figure 5:
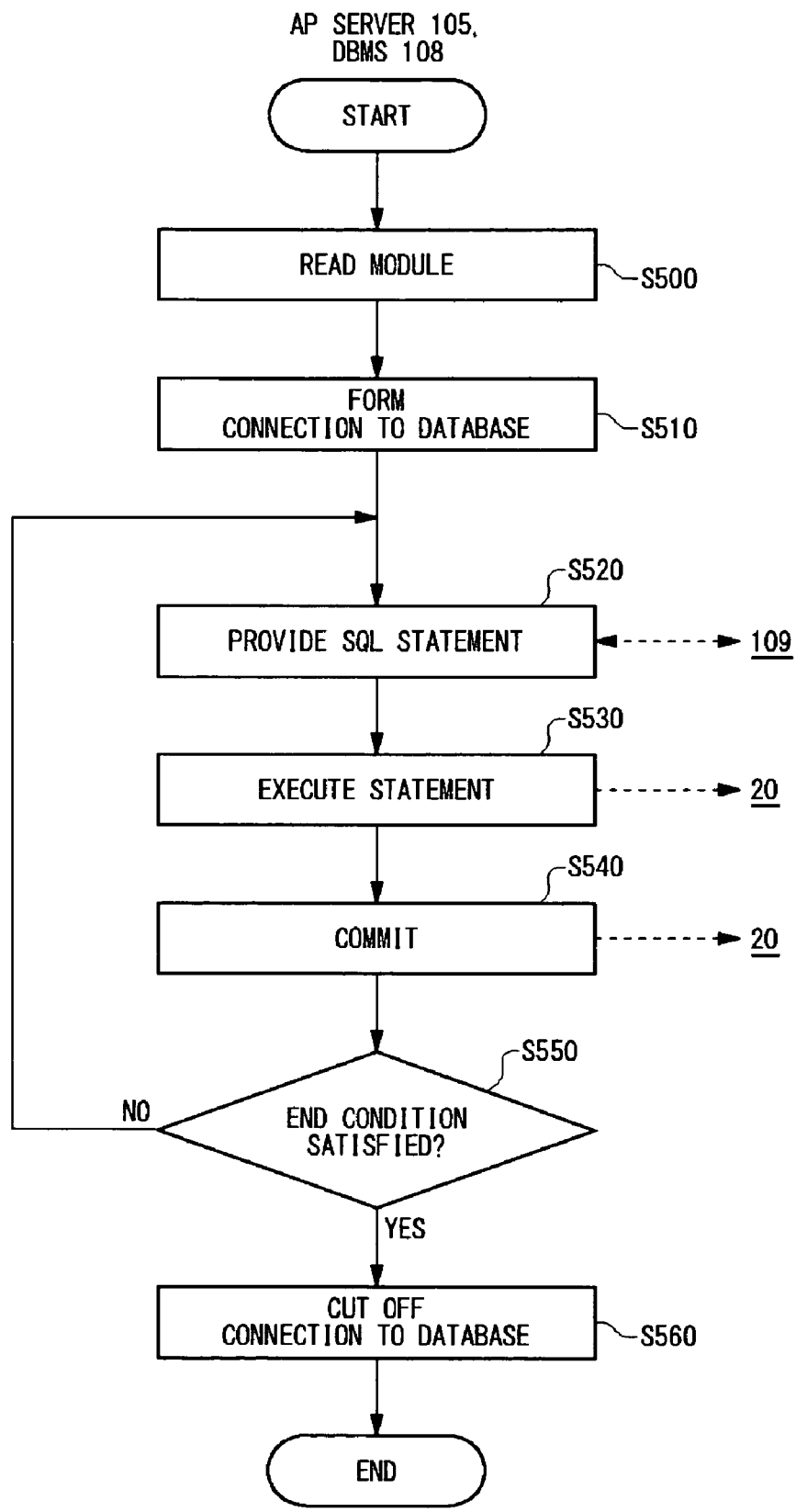
FIG. 5 illustrates an exemplary process flow performed by an Application Processing (AP) server and a Database Management System (DBMS) according to an embodiment of the present invention.

FIG. 5 illustrates an exemplary flow of the processing performed by AP server 105 and DBMS 108 relating to the present embodiment. The following description is made for AP server 105 and DBMS 108 provided by the processor computer 100A. AP server 105 reads a program module necessary for the processing, and starts executing the read program module (step S500). DBMS 108 starts the connection with the database 20 (step S510).

During the execution of the program module, AP server 105 may issue a SQL statement (step S520). Under the condition that the SQL statement to be issued is fixed, the control system 109 starts operating. The operation of the control system 109 is described later in more detail.

Under the condition that the control system 109 gives permission to issuance of the SQL statement, DBMS 108 executes the issued statement (step S530). Under the condition that access competition occurs following the execution of the statement, the arbitrating section 125 of the controller computer 120 performs the exclusion process. On completion of a series of accesses, DBMS 108 commits the process (step S540). The AP server 105 repeatedly performs the above-described processing until a predetermined end condition designated by the program module is satisfied (step S550: NO).

Under the condition that the predetermined end condition is satisfied (step S550:YES), the AP server 105 terminates the connection to the database 20, and ends the processing. The processor computers 100B and 100C respectively perform substantially the same processing. Therefore, the processing performed by the processor computers 100B and 100C is not further explained herein.

Figure 6:
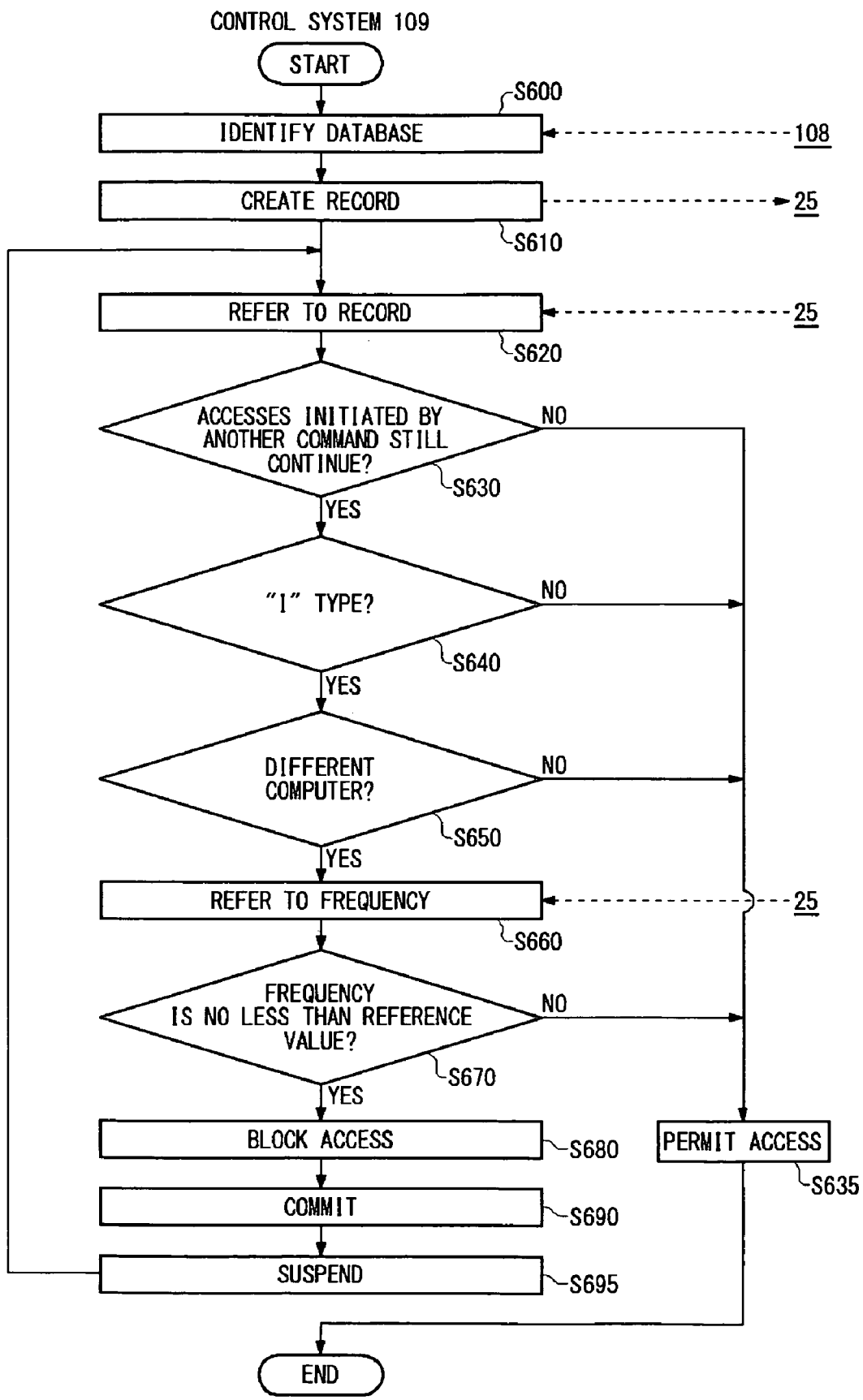
FIG. 6 illustrates an exemplary process flow performed by a control system according to an embodiment of the present invention.

FIG. 6 illustrates an exemplary flow of the processing performed by the control system 109 relating to the present embodiment. The database identifying section 300 starts operating under the condition that the SQL statement to be issued is fixed. To begin with, with reference to the statement input thereto, the database identifying section 300 identifies a database to be accessed by the input statement (step S600).

In this case, an attempt is made to start a new batch process. Therefore, the storage section 335 creates a record associated with the new batch process in the control information 25 (step S610). Storage section 335 may store, into the control information 25, the identification information identifying the computer which has issued the statement, the identification information identifying the database to be accessed, the type of the accesses indicated by the access command, and the start time for the accesses.

Following this, the access judging section 310 refers to the control information 25, and reads a record associated with a different batch process which also accesses the identified database (step S620). The access judging section 310 then judges whether a series of accesses to the identified database initiated by a different access command still continue (step S630).

Specifically, the access judging section 310 reads a record associated with the identified database from the control information 25. When a plurality of records are associated with the identified database, the access judging section 310 reads the plurality of records. Note that the record that is created in the step S610 is not read. The access judging section 310 determines that there is a series of continuing accesses to the identified database under the condition that the commit time is not recorded in one or more of the read records. The access judging section 310 records the current time in the column "the time at which the table to be accessed is checked (in FIG. 4, referred to as TABLE CHECKING TIME") in each of the records.

When determining that there is a series of continuing accesses (step S630:YES), the access judging section 310 further determines whether the series of continuing accesses initiated by a different access command is made to create a new record into the identified database (step S640). This determination may be made, for example, by whether the access type "I" is recorded in association with the series of continuing accesses in the control information 25.

In addition to the determination as to whether the series of continuing accesses are made to create a record, the access judging section 310 may determine whether the series of continuing accesses are made to update the database, including updating a record. Note that a record creating access tends to require a relatively complicated and lengthy control, for example, obtaining a new storage region. Therefore, the access determining section 310 is preferably configured so as to at least determine whether the series of continuing accesses are made to create a record. With such a configuration, the present embodiment can prevent efficiency degradation which is caused by frequent occurrence of the exclusion process.

When determining that the series of continuing accesses are made to create a record (step S640:YES), the access judging section 310 determines whether the computer which has issued the input statement (i.e., the processor computer 100A) is different from the computer which has issued the different access command (step S650). This determination may be made, for example, with reference to the computer identification information recorded in the control information 25.

When determining positively in all of the above determining steps (step S650:YES), the access judging section 310 the frequency of accesses made to the identified database (step S660). The access frequency may be determined, for example, with reference to a record in the control information 25 which is associated with the identified database. To be specific, the access judging section 310 may calculate the access frequency by dividing the number of accesses in the record by the time period from the access start time to the commit time in the record.

The access judging section 310 may record the access frequency calculated in the above manner in the rightmost column in the control information 25. Under the condition that the access frequency has been calculated in advance and thus recorded in the rightmost column in the control information 25, the access section 310 may simply read the recorded access frequency.

Here, a plurality of records may be recorded in the control information 25 in association with the same database. This indicates that a plurality of sets of accesses have been made to the database. If such is the case, the access judging section 310 may calculate a plurality of access frequencies in association with the plurality of records in a one-to-one correspondence, or a single access frequency, for example, based on the average value among the access frequencies. Alternatively, under the condition that a plurality of sets of accesses are associated with the same database, the access judging section 310 may calculate the access frequency only in association with the series of accesses which is most recently committed.

Access judging section 310 may then determine whether the access frequency calculated for the identified database is higher than or equal to a predetermined reference value (step S670). The reference value may be calculated by the reference value calculating section 325. The calculation is described herein below.

The process capacity of, for example, the CPU 1000 (FIG. 7) of the controller computer 120 puts a limitation on the process capacity per unit time of the arbitrating section 125. Also, the limited process capacity may not be always available entirely since the controller computer 120 may be executing a variety of control processes. To cope with this issue, the storage section 335 sequentially monitors the available process capacity per unit time of the arbitrating section 125. For example, the storage section 335 may calculate, as the available process capacity, the value of "1−r (%)", where r (%) indicates the CPU utilization and is continuously calculated by the operating system of the controller computer 120.

The processing amount required to perform one cycle of the exclusion process by means of the arbitrating section 125 is roughly determined in advance. For example, when it requires "a" message transmissions between the controller computer 120 and the processor computers 100A to 100C to perform one cycle of the exclusion process and it takes "β" (a measure of time, for example, seconds) for one message transmission, one cycle of the exclusion process requires the processing amount of α×β.

The reference value calculating section 325 calculates the reference value by dividing the available process capacity (1−r) by the predetermined processing amount necessary for one cycle of the exclusion process (α×β). Under the condition that the frequency of the competing accesses is higher than or equal to the reference value calculated in the above manner, the frequency of the occurrence of the exclusion process exceeds the limitation created by the capacity to process the arbitrating section 125. Therefore, the processing efficiency of the controller computer 120 may significantly degrade.

The access control section 330 compares the access frequency calculated in the step S660 with the above-described reference value (step S670). Under the condition that only one access frequency is calculated in the step S660, the access control section 330 compares the one access frequency with the reference value (step S670). On the other hand, in a case where a plurality of access frequencies are calculated in the step S660, the access control section 330 determines whether the highest access frequency is higher than or equal to the reference value, for example. In this manner, even if one of the already completed batch processes which has the highest access frequency is requested again, the present embodiment can prevent the degradation in the efficiency of the controller computer 120.

When determining that the access frequency is higher than or equal to the reference value (step S670:YES), the access control section 330 blocks the accesses to the database made by the access command input to perform the first batch process (step S680). In accordance with the blocking, the access control section 330 suspends the first batch process, and commits one or more of the processes of the first batch process which have already been executed (step S690). As a result, the present embodiment can prevent deadlock from happening between the first and other batch processes.

Storage section 335 may update the commit time in the corresponding record in the control information 25. Consequently, the control system 109 can calculate the access frequency for the first batch process based on the updated commit time. The calculated access frequency can be referred to in the determining step when another batch process is started.

Subsequently, the access control section 330 suspends the operation of the computer used to execute the first batch process, for example, the DBMS 108 for a certain time period (step S695). The operation suspending period is preferably defined so as to have a predetermined time period with respect to the time in the "TABLE CHECKING TIME" column which is associated with the corresponding table in the control information 25. After the suspension of the certain time period, the processor computer 100A goes back to the processing in the step S620, to determine whether the competing batch process has been completed.

Under the condition that the second batch process has ended (step S630:NO), the series of continuing accesses are not related to updating or creating (step S640:NO), the competing batch process is performed by the same computer (step S650:NO), or the access frequency is less than the reference value (step S670:NO), the access control section 330 notifies the DBMS 108 of the permission to start the first batch process (step S635).

The reason why the permission is given to start the batch process when the series of continuing accesses are not related to updating or creating is that the exclusion process is unlikely to occur when the series of continuing accesses are related to referencing. The reason why the permission is given to start the batch process when the competing batch process is executed by the same computer is that the exclusion process is based on the coordination between different computers and thus not necessary. The reason why the permission is given to start the batch process when the access frequency is less than the reference value is that the frequency of the occurrence of the exclusion process is low and the arbitrating section 125 can perform the exclusion process well within its process capacity.

The above description is made to explain an exemplary operation of the control system 109 of the processor computer 100A with reference to FIG. 6. The control systems 109 of the processor computers 100B and 100C perform substantially the same operation. In other words, the control system 109 of each of the processor computers 100A to 100C independently performs the above-described operation. In this manner, each of the processor computers 100A to 100C determines whether a competing batch process still continues. When determining positively, each processor computer suspends the operation. As a result, the information system 10 can operate efficiently as a whole.

FIG. 7 illustrates an exemplary hardware configuration of the processor computer 100A relating to the present embodiment and the peripheral apparatuses thereof. The hardware configuration is constituted by a CPU surrounding section, an input/output (I/O) section and a legacy I/O section. The CPU surrounding section includes a CPU 1000, a RAM 1020 and a graphic controller 1075 which are connected to each other via a host controller 1082. The I/O section includes a communication interface 1030, a hard disk drive 1040, and a CD-ROM drive 1060 which are connected to the host controller 1082 via an I/O controller 1084. The legacy I/O section includes a ROM 1010, a flexible disk drive 1050, and an I/O chip 1070 which are connected to the I/O controller 1084.

The host controller 1082 connects the RAM 1020 with the CPU 1000 and graphic controller 1075 which access the RAM 1020 at a high transfer rate. The CPU 1000 operates in accordance with programs stored on the ROM 1010 and RAM 1020. The graphic controller 1075 obtains image data which is generated by the CPU 1000 or the like on a frame buffer provided within the RAM 1020, and causes a display device 1080 to display the obtained image data. Alternatively, the graphic controller 1075 may include therein a frame buffer for storing thereon the image data generated by the CPU 1000 or the like.

The I/O controller 1084 connects, to the host controller 1082, the hard disk drive 1040, communication interface 1030 and CD-ROM drive 1060 which are relatively high speed I/O devices. The communication interface 1030 is shown as an example of the above-described communication interface 102, and communicates with external apparatuses via the network. The hard disk drive 1040 realizes the above-described database 20, for example, and stores thereon programs and data to be used by the processor computer 100A. The CD-ROM drive 1060 reads programs or data from a CD-ROM 1095, and supplies the read programs or data to the RAM 1020 or hard disk drive 1040.

The I/O controller 1084 is also connected to the ROM 1010, flexible disk drive 1050 and I/O chip 1070 which are relatively low speed I/O devices. The ROM 1010 stores thereon a boot program executed by the CPU 1000 at the start up of the processor computer 100A, programs dependent on the hardware of the processor computer 100A, and the like. The flexible disk drive 1050 reads programs or data from a flexible disk 1090, and supplies the programs or data to the hard disk drive 1040 or RAM 1020 via the I/O chip 1070. The I/O chip 1070 is connected to the flexible disk drive 1050, and used to connect a variety of I/O devices, via a parallel port, a serial port, a keyboard port, a mouse port or the like, to the processor computer 100A.

The programs to be provided to the processor computer 100A are provided by a user through being stored on a recordable medium such as the flexible disk 1090, the CD-ROM 1095, and an IC card (not shown). The programs are read from the recordable medium via the I/O chip 1070 and/or I/O controller 1084, and the programs are installed in the processor computer 100A to be executed. The programs cause the processor computer 100A or the like to perform the operation described with reference to FIGS. 1 to 6.

The programs mentioned above may be stored on an external recordable medium. Such a recordable medium may be, for example, an optical recordable medium such as DVD or CD, a magnetic-optical recordable medium such as a mini disk, a tape medium, a semiconductor memory such as an IC card and the like, in addition to the flexible disk 1090 and CD-ROM 1095. Alternatively, the recordable medium may be a storage device such as a hard disk or RAM which is provided in a server system connected to a dedicated communication network or the Internet, and the programs may be provided to the processor computer 100A via the network.

As described above, the information system 10 relating to the present embodiment can perform the exclusion process between tasks which each generate successive accesses, such as batch processes, in addition to the exclusion process between the accesses to the database to maintain the consistency of the database. Therefore, the present embodiment can prevent the degradation in performance which is caused by frequent occurrence of the exclusion process without manually scheduling the tasks to avoid access competition. As a result, the information system 10 relating to the present embodiment can operate efficiently even when it is difficult to identify in advance tables to be accessed for performing the tasks and thus difficult to manually schedule the tasks, for example, in a case where an ERP package is used with the information system 10.

Although some aspects of the present invention have been described by way of an exemplary embodiment, it should be understood that those skilled in the art might make changes and substitutions without departing from the spirit and the scope of the present invention which is defined only by the appended claims.

What is claimed is:

1. A method for controlling accesses to a database, comprising:
   identifying a database by an input of a first access command;
   determining whether a series of accesses to the identified database initiated by a second access command still continue;
   determining how often accesses to the identified database occurs with reference to a history of accesses; and
   checking the access made by the first access command to the identified database under the condition that the series of accesses to the identified database initiated by the second access command still continue and the frequency of accesses to the identified database determined by the frequency determining section is higher than or equal to a predetermined value.

2. A method for controlling accesses to a database, comprising:
   identifying a database from a first command received from a first computer that initiated the first command as a first series of accesses to a database;
   after said identifying the database and while the first command has not been performed, ascertaining that a second series of accesses to the database, initiated by a second command from a second computer, is currently being performed;
   determining an access frequency at which accesses to the database have occurred;
   after said determining the access frequency and in response to said ascertaining, determining, by a processor of a computer, that each condition of at least one condition is satisfied, said at least one condition including a condition of the access frequency not being less than a predetermined reference frequency; and
   in response to having determined that the at least one condition is satisfied, performing an exclusion process that comprises blocking and suspending execution of the first command.

3. The method of claim 2, wherein the at least one condition includes a condition of the second computer differing from the first computer.

4. The method of claim 2, wherein the at least one condition includes a condition of the first command being a command to create a new record or update an existing record in the database.

5. The method of claim 2, wherein the method further comprises:
- prior to having determined that the condition of the access frequency not being less than the predetermined reference frequency is satisfied, computing the reference frequency as equal to $(1-r)/(\alpha\beta)$, wherein r is a fraction of previous time during which the processor has been utilized, wherein $\alpha$ is a number of message transmissions to and from the processor to perform one cycle of the exclusion process, and wherein $\beta$ is a measure of an amount of time for performing each message transmission.

6. The method of claim 2, wherein the method further comprises:
- after said identifying the database and while the first command has not been performed, creating in a data storage device a data record associated with the first command, said creating comprising storing in the record: an identification of the first computer, an identification of the database, an identifier of a type of access in the first command, and a start time at which a first access of the first series of accesses is to be initiated; and
- after said determining the access frequency, recording in the data record the access frequency.

7. The method of claim 6, wherein the method further comprises:
- after said blocking and suspending execution of the first command, determining that the second series of accesses to the database have been completed and that at least one access of the first series of accesses have been performed, followed by committing the at least one access and recording in the data record a time of said committing.

8. A computer program product, comprising a computer readable physically tangible storage device having a computer readable instructions stored therein, said instructions configured to be executed by a processor of a computer to implement a method for controlling accesses to a database, said method comprising:
- identifying a database from a first command received from a first computer that initiated the first command as a first series of accesses to a database;
- after said identifying the database and while the first command has not been performed, ascertaining that a second series of accesses to the database, initiated by a second command from a second computer, is currently being performed;
- determining an access frequency at which accesses to the database have occurred;
- after said determining the access frequency and in response to said ascertaining, determining that each condition of at least one condition is satisfied, said at least one condition including a condition of the access frequency not being less than a predetermined reference frequency; and
- in response to having determined that the at least one condition is satisfied, performing an exclusion process that comprises blocking and suspending execution of the first command.

9. The computer program product of claim 8, wherein the at least one condition includes a condition of the second computer differing from the first computer.

10. The computer program product of claim 8, wherein the at least one condition includes a condition of the first command being a command to create a new record or update an existing record in the database.

11. The computer program product of claim 8, wherein the method further comprises:
- prior to having determined that the condition of the access frequency not being less than the predetermined reference frequency is satisfied, computing the reference frequency as equal to $(1-r)/(\alpha\beta)$, wherein r is a fraction of previous time during which the processor has been utilized, wherein $\alpha$ is a number of message transmissions to and from the processor to perform one cycle of the exclusion process, and wherein $\beta$ is a measure of an amount of time for performing each message transmission.

12. The computer program product of claim 8, wherein the method further comprises:
- after said identifying the database and while the first command has not been performed, creating in a data storage device a data record associated with the first command, said creating comprising storing in the record: an identification of the first computer, an identification of the database, an identifier of a type of access in the first command, and a start time at which a first access of the first series of accesses is to be initiated; and
- after said determining the access frequency, recording in the data record the access frequency.

13. The computer program product of claim 12, wherein the method further comprises:
- after said blocking and suspending execution of the first command, determining that the second series of accesses to the database have been completed and that at least one access of the first series of accesses have been performed, followed by committing the at least one access and recording in the data record a time of said committing.

14. A system comprising a computer, said computer comprising a processor and a computer readable memory unit coupled to the processor, said memory unit containing instructions configured to be executed by the processor to implement a method for controlling accesses to a database, said method comprising:
- identifying a database from a first command received from a first computer that initiated the first command as a first series of accesses to a database;
- after said identifying the database and while the first command has not been performed, ascertaining that a second series of accesses to the database, initiated by a second command from a second computer, is currently being performed;
- determining an access frequency at which accesses to the database have occurred;
- after said determining the access frequency and in response to said ascertaining, determining that each condition of at least one condition is satisfied, said at least one condition including a condition of the access frequency not being less than a predetermined reference frequency; and
- in response to having determined that the at least one condition is satisfied, performing an exclusion process that comprises blocking and suspending execution of the first command.

15. The system of claim 14, wherein the at least one condition includes a condition of the second computer differing from the first computer.

16. The system of claim 14, wherein the at least one condition includes a condition of the first command being a command to create a new record or update an existing record in the database.

17. The system of claim 14, wherein the method further comprises:
   prior to having determined that the condition of the access frequency not being less than the predetermined reference frequency is satisfied, computing the reference frequency as equal to $(1-r)/(\alpha\beta)$, wherein r is a fraction of previous time during which the processor has been utilized, wherein $\alpha$ is a number of message transmissions to and from the processor to perform one cycle of the exclusion process, and wherein $\beta$ is a measure of an amount of time for performing each message transmission.

18. The system of claim 14, wherein the method further comprises:
   after said identifying the database and while the first command has not been performed, creating in a data storage device a data record associated with the first command, said creating comprising storing in the record: an identification of the first computer, an identification of the database, an identifier of a type of access in the first command, and a start time at which a first access of the first series of accesses is to be initiated; and
   after said determining the access frequency, recording in the data record the access frequency.

19. The system of claim 18, wherein the method further comprises:
   after said blocking and suspending execution of the first command, determining that the second series of accesses to the database have been completed and that at least one access of the first series of accesses have been performed, followed by committing the at least one access and recording in the data record a time of said committing.

* * * * *